US007072937B2

(12) United States Patent
Neebe et al.

(10) Patent No.: US 7,072,937 B2
(45) Date of Patent: Jul. 4, 2006

(54) WEB-BASED COMMON USE TERMINAL WITH MULTIPLE APPLICATION SERVERS

(75) Inventors: Mark T. Neebe, Catonsville, MD (US); Bruce G. Chestnutt, Sykesville, MD (US); Randall K. Neilson, Crownsville, MD (US); Ann C. Schofield, Ellicott City, MD (US); Cathryne I. Tondreau, Crofton, MD (US)

(73) Assignee: Northrop Grumman Corporation, Los Angeles, CA (US)

( * ) Notice: Subject to any disclaimer, the term of this patent is extended or adjusted under 35 U.S.C. 154(b) by 666 days.

(21) Appl. No.: 10/099,947

(22) Filed: Mar. 19, 2002

(65) Prior Publication Data

US 2002/0138548 A1 Sep. 26, 2002

Related U.S. Application Data

(60) Provisional application No. 60/278,656, filed on Mar. 21, 2001.

(51) Int. Cl.
*G06F 15/16* (2006.01)

(52) U.S. Cl. ...................... 709/203; 709/202; 709/221; 709/222; 700/241; 700/242

(58) Field of Classification Search ........ 709/201–203, 709/220–222; 700/241–242, 230, 237; 705/400–401
See application file for complete search history.

(56) References Cited

U.S. PATENT DOCUMENTS

| | | | | | |
|---|---|---|---|---|---|
| 5,159,560 | A | * | 10/1992 | Newell et al. | 700/215 |
| 5,319,562 | A | * | 6/1994 | Whitehouse | 705/403 |
| 5,892,905 | A | | 4/1999 | Brandt et al. | |
| 6,005,945 | A | | 12/1999 | Whitehouse | |
| 6,101,510 | A | | 8/2000 | Stone et al. | |
| 6,195,694 | B1 | * | 2/2001 | Chen et al. | 709/220 |
| 6,249,777 | B1 | * | 6/2001 | Kara et al. | 705/404 |
| 6,286,029 | B1 | * | 9/2001 | Delph | 709/203 |
| 6,308,887 | B1 | | 10/2001 | Korman et al. | |
| 6,324,573 | B1 | | 11/2001 | Rhoads | |
| 6,341,274 | B1 | | 1/2002 | Leon | |
| 6,349,292 | B1 | * | 2/2002 | Sutherland et al. | 705/62 |
| 6,519,596 | B1 | * | 2/2003 | Hoyt et al. | 707/10 |
| 6,757,683 | B1 | * | 6/2004 | Goodwin et al. | 707/10 |
| 2002/0059359 | A1 | * | 5/2002 | Curry | 709/201 |
| 2002/0065931 | A1 | * | 5/2002 | Goodwin et al. | 709/232 |
| 2002/0099791 | A1 | * | 7/2002 | Goodwin et al. | 709/218 |
| 2002/0129170 | A1 | * | 9/2002 | Moore et al. | 709/249 |
| 2002/0156835 | A1 | * | 10/2002 | Williams et al. | 709/203 |

* cited by examiner

*Primary Examiner*—Dung Dhih
*Assistant Examiner*—LaShanya Nash
(74) *Attorney, Agent, or Firm*—Birch, Stewart, Kolasch & Birch, LLP

(57) ABSTRACT

A web-based common use terminal, e.g. a kiosk of an item delivery and retrieval system utilizing a web connection with one or more web servers for respective delivery service providers with any desired number of applications being separately run, depending upon the needs of a user. In a preferred embodiment, four discrete application including package pick-up, package exchange, buying postage, and club type delivery and pick-up of discrete items, are hosted while using the same system hardware.

20 Claims, 7 Drawing Sheets

WEB-BASED COMMON USE TERMINAL WITH MULTIPLE APPLICATION SERVERS

CLAIM OF PRIORITY

This application is a Non-Provisional application including the subject matter and claiming the priority date under 35 U.S.C. §119(e) of Provisional Application Ser. No. 60/278,656, filed on Mar. 21, 2001, the contents of which are meant to be incorporated herein by reference.

CROSS REFERENCE TO RELATED APPLICATION

This application is related to Non-Provisional application U.S. Ser. No. 09/817,375, entitled "Item Delivery And Retrieval System", filed in the names of David J. Tilles et al. on Mar. 27, 2001, which claims priority of Provisional Application Ser. No. 60/220,842, filed on Jul. 26, 2000 and Provisional Application Ser. No. 60/265,875, filed on Feb. 5, 2001. This application is also assigned to the assignee of the subject application. The contents of this related application is also meant to be specifically incorporated herein by reference.

BACKGROUND OF THE INVENTION

1. Field of the Invention

This invention relates generally to a digital computer system including a browser based terminal for executing multiple applications and, more particularly, to a web-page based common use interface for hosting multiple independent software applications on the same hardware platform.

2. Description of Related Art

Internet type systems linking one or more software programs called web browsers residing in a digital computer or platform and one or more software programs called servers for implementing one or more specific functions called applications is generally well known. A browser is a client program that typically uses the Hypertext Transfer Protocol to make requests of web server(s) throughout the Internet on behalf of the browser. A server, on the other hand, is a program that fulfills the request of a client program of a browser.

In such an environment, various types of tasks or applications are known to have been implemented for supporting a variety of services, for example, ATM transactions, point-of-sale transactions and the dispensing of postage.

In the above-referenced related application U.S. Ser. No. 09/817,375, entitled "Item Delivery And Retrieval System" there is disclosed a secure item and delivery/return (IDRS) system which permits a user such as a customer to retrieve undelivered items or return items at a specified location without human intervention on demand. Typically, a customer receives some type of notification that an undeliverable item is stored at a remote location where there is located an item delivery retrieval system which includes apparatus for holding one or more items. When it is convenient, the customer subsequently travels to the location of the system and retrieves the items.

The aforesaid IDRS system includes a storage sub-system and a computer sub-system. The storage sub-system provides an item storage and delivery environment including a secure enclosure having an item storage carousel including control apparatus as well as a set of sensors. A computer sub-system is embodied in a user access terminal, such as a kiosk, which hosts web-page based customize application software for implementing an application interface of selectively configurable application interface controls for providing user access to the carousel via one or more storage bins located behind a set of normally closed doors which are selectively opened and then closed for items storage and retrieval, provides access control to the bins, and manages the location of items in the storage sub-system. The doors are open when proper identification is provided by user so as to permit access only to specified designated bin locations.

The system also includes web browser software which interfaces with one or more servers over the internet to exchange data, retrieve documents, and display web pages. In addition to browser software residing in the user access terminal, the terminal also includes a screen which may be a touch screen as well as other option devices such as a bar code reader, credit/debit card reader, pin pad, printer, signature pad, and one or more security cameras.

SUMMARY

Accordingly, it is an object of the present invention to provide a web-page based common use interface which hosts multiple, independent software applications on the same hardware platform.

It is a further object of the invention to provide a self-service user access terminal which operates in a shared common use environment.

It is another object of the invention to provide a common use shared browser device which can execute multiple applications while using the same peripheral devices.

It is still another object of the invention to provide a self-service user access terminal in the form of a kiosk of an item delivery and retrieval system which hosts multiple independent software applications while sharing the same peripheral devices.

These and other objects are achieved by a web-page based common use interface embodied in and executed on a platform such as an item delivery and retrieval system including browser software located in a common use access terminal which executes multiple independent software applications with the multiple applications running on respective server programs, including multiple package servers from discrete delivery service providers. In a preferred embodiment, four discrete applications including, but not limited to, package pick-up, package exchange, buying postage, and club type delivery and pick-up of discrete items, are hosted while using the same system hardware. Each application is launched from a main touch screen of the common use access terminal which, in the aforesaid item delivery and retrieval system, is in the form of a kiosk. Upon selection of one of the four applications, the selected application web server program takes control of the system and its peripherals for the balance of the particular session. During a session, no other server can use the kiosk or its peripherals, nor can any other user interact with another server. At the conclusion of the execution of the application, common use software in the kiosk clears all sensitive data where necessary so that another user cannot retrieve the data.

Further scope of applicability of the present invention will become apparent from the detailed description provided hereinafter. It should be understood, however, that the detailed description and specific examples, while disclosing the preferred embodiment and applications executed in accordance with the invention, they are provided by way of illustration only, since various changes and modifications within the spirit and scope of the invention will become apparent to those skilled in the art.

BRIEF DESCRIPTION OF THE DRAWINGS

The present invention will become more fully understood from the detailed description provided hereinafter, when considered together with the accompanying drawings which are provided by way of illustration only, and wherein.

DETAILED DESCRIPTION OF THE INVENTION

Figure 1:
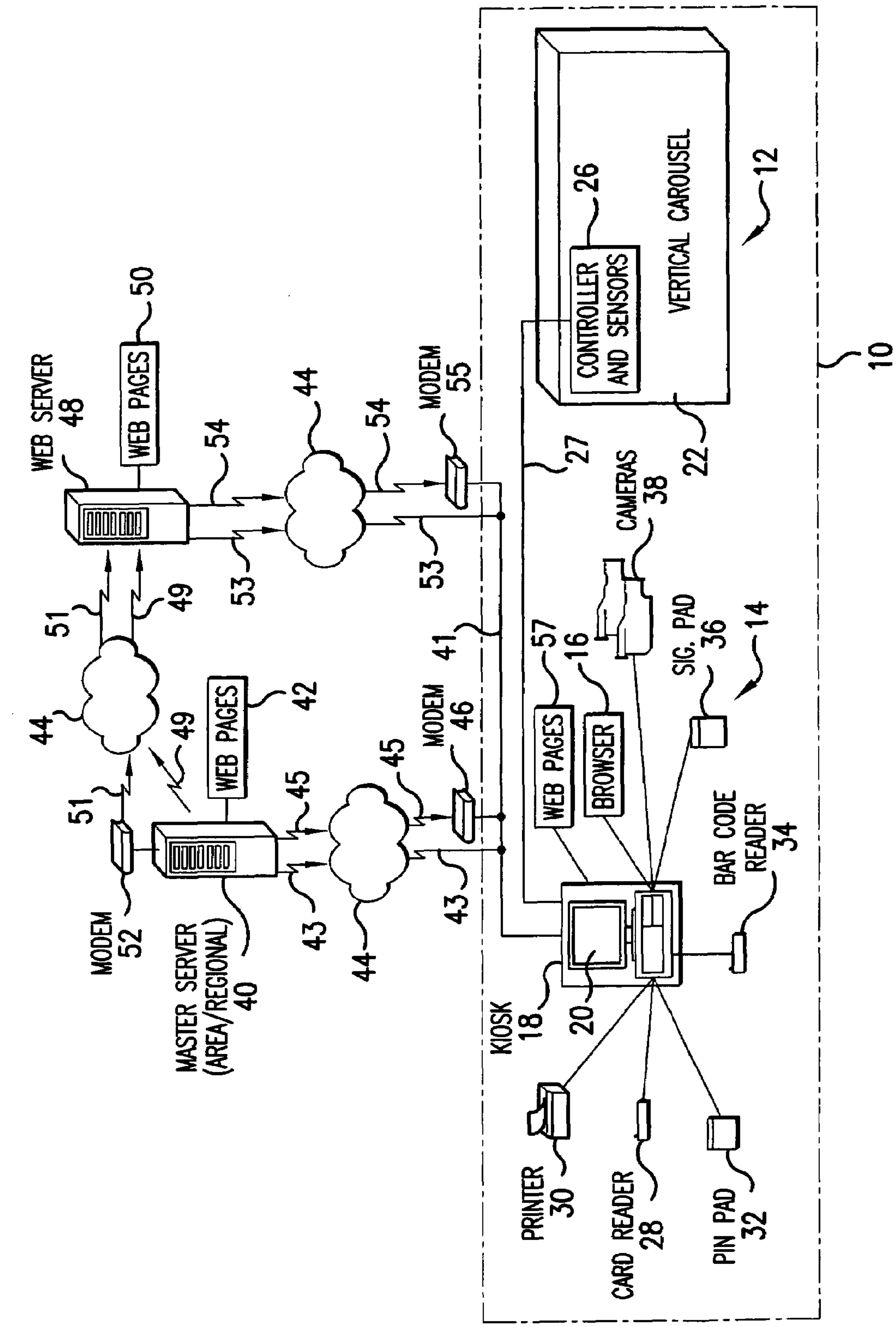
FIG. 1 is a block diagram illustrative of the system architecture of an item delivery and retrieval system comprising the hardware platform in accordance with the subject invention which hosts multiple, independent software applications.

Referring now to FIG. 1, shown thereat is a block diagram partially illustrative of the web enabled item storage and retrieval system shown and disclosed in the above referenced related application, U.S. Ser. No. 09/817,375, which is incorporated herein in its entirety for illustrating the preferred embodiment of a common use hardware platform for hosting multiple independent software applications which will be described hereinafter.

FIG. 1, moreover, is illustrative of the architecture for an item and delivery retrieval system (IDRS) 10 including, among other things, a storage sub-system 12 and a computer sub-system 14. The computer sub-system 14 includes computer apparatus having software, such as browser software 16, also referred to simply as a browser, and which is internet web-page based. The browser software 16 resides in a user access terminal in the form of a kiosk 18 having a screen 20 which includes a touch selection mode for selection of an application to be subsequently described.

Figure 2:
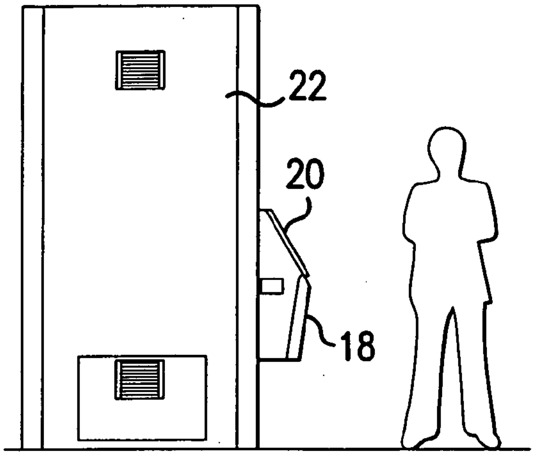
FIG. 2 is an end elevational view generally illustrative of a vertical carousel and kiosk shown in FIG. 1.
Figure 3:
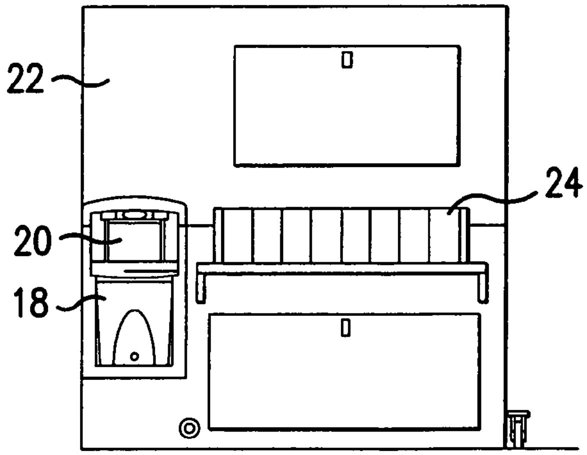
FIG. 3 is a front elevational view of the vertical carousel shown in FIG. 1 further depicting a kiosk mounted on the front thereof, as well as a plurality of access doors therefor.
Figure 4:
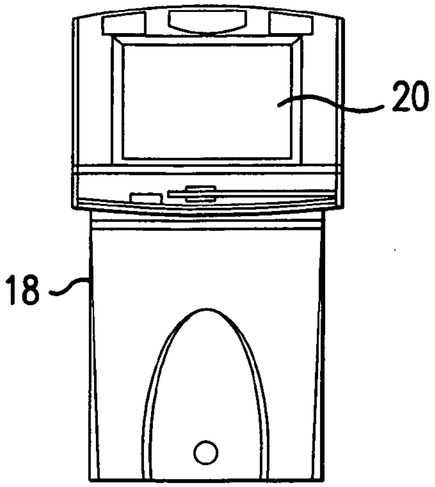
FIG. 4 is a front elevational view further illustrative of the kiosk shown in FIGS. 2 and 3.

The kiosk 18 is shown in FIGS. 2 and 3 mounted on the front of a vertical carousel 22 which includes multiple bins, not shown, and which are accessible via an arrangement of access doors 24. Access to the carousel 22 is provided by way of the kiosk 18 through a carousel controller and sensor sub-system 26 via a control bus 27. Peripheral devices are also associated with the kiosk 18, and includes, among other things, a magnetic card reader 28, a printer 30, a PIN number pad 32, a bar code reader 34, and a signature pad 36, also, one or more user observation cameras 38.

Further as shown in FIG. 1, a master server 40 supports and stores set(s) of web pages 42 which are connected directly to the browser software of the kiosk 18 by way of a direct connection signal path 43 through the internet (or, when desirable, intranet) 44 or a dial-up connection via signal path 45 including a modem 46. A web server 48 including sets of web pages 50, is also shown connected back to the master server 40 either by way of a direct internet connection via signal path 49 or a dial-up connection through internet 44 via signal path 51 and modem 52. Web server 48 is also connected to the browser software 16 of the kiosk 18 by way of a direct signal path 53 connected to the signal bus 41 or a dial-up connection by way of a signal path 54 and a modem 55.

The master server 40 includes a centralized data base for the IDRS system 10 for storing, among other things, data including user e-mail addresses, user account/or loyalty card information, item status, and other information needed to operate the IDRS system 10 and, when desirable, one or more application programs which reside in the web pages 42. The web server 48 is shown comprising a single web server, but, when desirable, may be comprised of a multiplicity of web servers, each including web pages for storing one or more specific application program depending upon the needs of the user. To enhance performance in the preferred embodiment of the subject invention, web pages for one or more specific application programs as shown by reference number 57 may be stored in the kiosk 18. and are displayable, on demand, on the screen 20.

The foregoing has been presented as background information for understanding the inventive concept which is now to be described. A more detailed description and understanding of the IDRS system 10 can be obtained by reference to the above-referenced related application U.S. Ser. No. 09/817,375.

Figure 5:
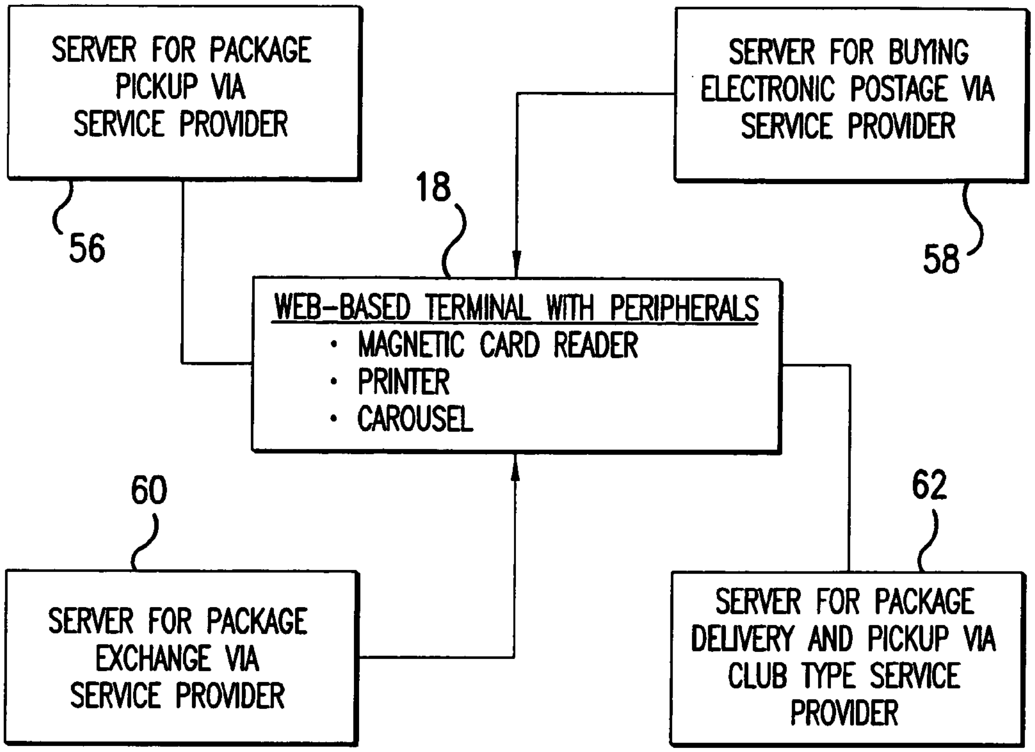
FIG. 5 is a system block diagram illustrative of the inventive concept of the subject invention wherein a common use terminal shares peripherals with four discrete service provider server applications.

Considering now FIGS. 5–10, FIG. 5 depicts a block diagram of the subject invention wherein multiple discrete applications are executed on the same hardware platform, i.e., the kiosk 18 of the IDRS system 10 shown in FIG. 1. The browser 16 residing in the kiosk 18 hosts multiple applications running on multiple server software residing in either the web pages 42 of the master server 40, web pages 50 of the web server 48, or the web pages 57 of the kiosk 18. As shown in FIG. 5, four (4) discrete applications are hosted by the browser 16. The applications are run on individual server software programs as shown by reference numerals 56, 58, 60 and 62. In the preferred embodiment of the subject invention, all four of the server programs 56, 58, 60 and 62 reside in the web pages 50 of the web server 48.

The first server application 56 is a "package pick up" application which implements package pick-up service based on connection across the network operating on a server program in the web pages 50 of the web server 48 linked to a package tracking number that may be contained in a bar code identifier on a package which resides in the carousel 22. Typically, the package is being stored after unsuccessful delivery on the part of a delivery service.

The second server application 58 comprises an electronic "Buy Postage" application including electron stamp printing. In this application which resides in the web pages 50 of the web server 48, the server 58 does not require the use of the IDRS carousel 22, but only the peripherals surrounding the kiosk 18.

The third server application 60 comprises a "Package Exchange" application residing in the web pages 50 of the web server for networked devices used for unattended exchange of packages using PIN numbers via the PIN pad 32 at the kiosk 18.

The fourth server application 62 comprises a "Club Type Delivery and Pick Up" application included in the web pages 50 of the web servers requiring a loyalty card and a form of membership to access the carousel 22 and may operate stand alone without a network connection.

It should be noted that server applications 56, 60 and 62 all share the same carousel real estate in an individual secure manner. Although four applications are shown and described, any number of applications more or less than four, such as only one application could be implemented when desired. Whatever the number, each application shown in FIG. 5 is launched or entered from the kiosk 18 via touch selection of the screen 20.

Figure 6:
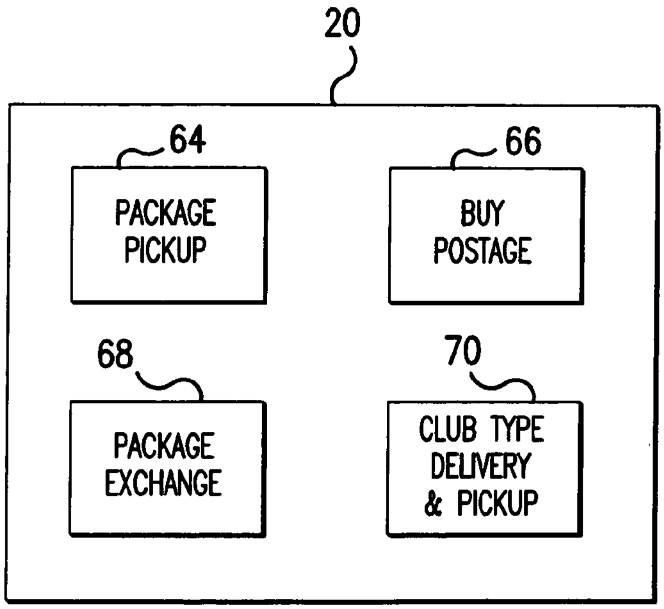
FIG. 6 is illustrative of a touch selection mode screen which displays the four types of server applications which are provided by the subject invention.
Figure 7:
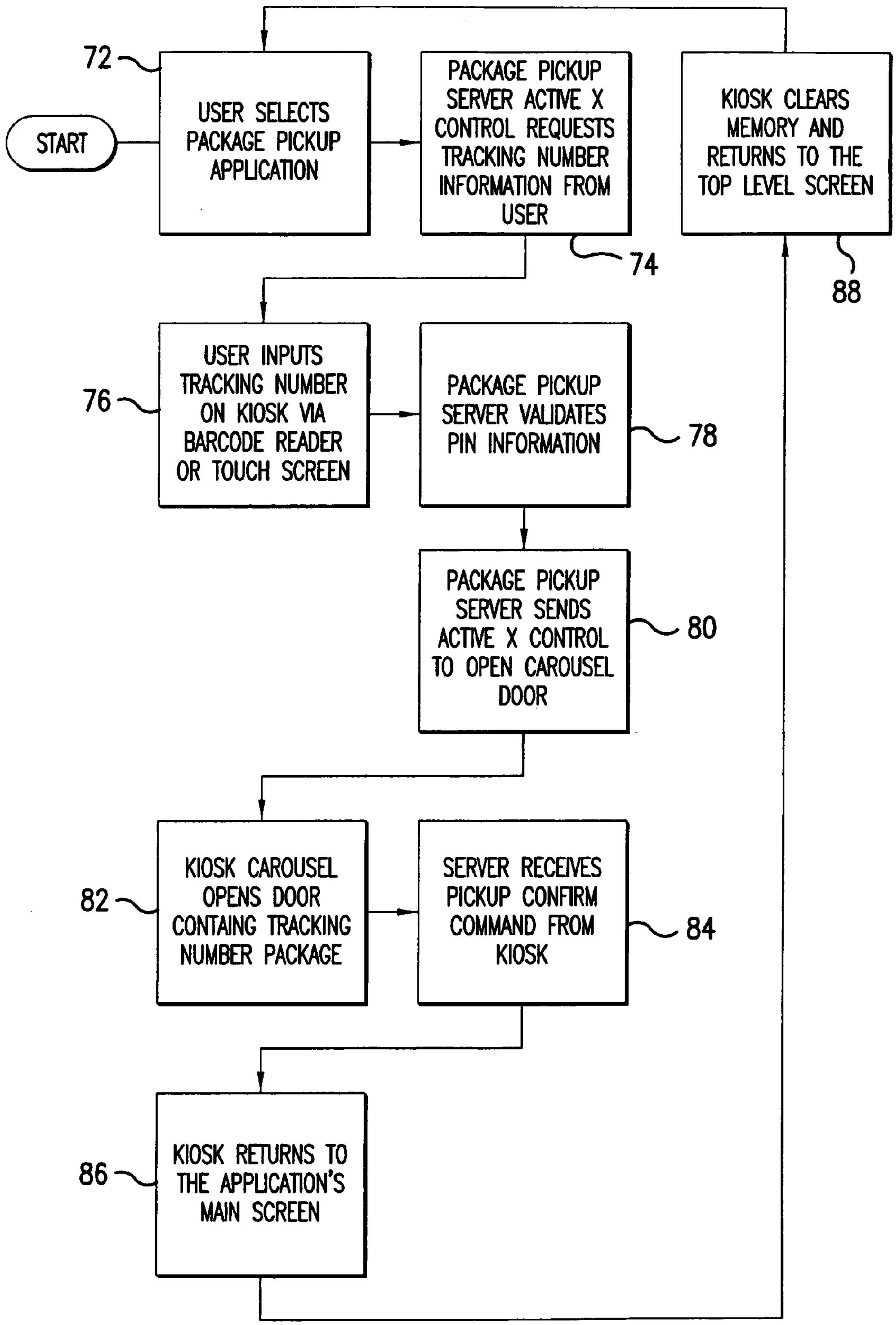
FIG. 7 is illustrative of a flow diagram of a package pick-up application executed in accordance with the subject invention by one of the server applications shown in FIG. 5.

Upon selection of any one of the four applications shown in FIG. 6, the server software 56, 58, 60 and 62 (FIG. 5) of the selected application takes control of the system 10 including the peripheral devices for the balance of the session. The software server of each application allows only that server to control the peripherals through the use of ActiveX Control type drivers shown and described for example in related application U.S. Ser. No. 09/817,375.

ActiveX control is well known in the art of digital computer technology. It is a programming language including a set of rules for how applications should share information and can be automatically downloaded from a server, e.g. the web server 48 (FIG. 1) and executed or run, for example, by the web browser 16 located in the kiosk 18. ActiveX controls have full access to an operating system in the subject invention using web pages from the server 48 and are used to implement specific control functions as will be described hereinafter.

When the "Buy Postage" icon 66, for example, is selected from the main touch screen 20 shown in FIG. 6, the browser software 16 of the kiosk 18 goes to the web server 48 across the internet 44, forms a secure connection either by the direct signal path 53 or by way of the dial-up connection involving signal path 54 and the modem 55, and then allows that server software 58 to use ActiveX control at the kiosk 18 to use the card swipe peripheral 28 to read information from a credit card, for example, which the browser 16 passes to the web server 48. After verification by the web server 48, ActiveX controls use the reserved kiosk peripheral, in this case the printer 30, to print bit maps of postage desired. Once the kiosk browser 16 has confirmed successful printing, the session with the user terminates and the kiosk 18 returns to the application's main page. Next, the ActiveX control portion of browser software 16 of the kiosk 18 permanently clears all sensitive data from the postage transaction from the kiosk memory, not shown, so that no other application can embed code to retrieve it. This feature provides an environment for multiple users and multiple applications to securely share the kiosk resources in a common use interface.

Once the "Buy Postage" application has been completed, the kiosk 18 including the browser 16 and its peripherals are available for another user with the same application or another application.

If the next user again selects the "Purchase Postage" application by pressing the "Buy Postage" icon 66, a totally new postage transaction is entered into with no way to compromise the security of trusted relationship between the postage server, the common used peripherals, and the first user. The second user establishes his/her own secure trusted relationship between kiosk 18, web server 48, and the kiosk's common use peripherals, e.g., the printer 30.

If, on the other hand, a user goes to the main screen 20 and selects an IDRS application to "Pick Up Packages" by pressing the icon 64 (FIG. 6), the kiosk browser 16 establishes a new web based connection with the unique package service server software 56, shown in FIG. 5 located in the web server 48. This package service server software now uses ActiveX control residing in the browser software 16 of kiosk 18 to take total control of the shared common used peripherals of the kiosk 18, including the card swipe device 28, printer 30, as well as control of the carousel 22 until completion of the transaction has been made by the user. During this session, no other server software, for example server software 58, 60 and 62, can use the kiosk 18 or its peripherals. Also, during each session such as in the "package exchange application", no server or user can access information about previous transactions on the kiosk 18. At the completion of the transaction, kiosk common use software permanently clears all sensitive data from the posted transaction from the kiosk memory so that no one can retrieve it.

Considering now the flow diagrams associated with the four applications described above, the flow chart shown in FIG. 7 discloses the various steps involved in executing the "package pick up" application. As shown by step 72 following "start", a user selects the package pick-up application by pressing the icon 64 (FIG. 6) on the screen 20. Next, the "package pick-up" server software 56 uses an ActiveX control from the browser software 16 in the kiosk 18 to request tracking number information from the user as shown by step 74. Next, the user inputs a tracking number on the kiosk 18 via the bar code reader 34 or touch screen 20 via step 76. The package pick up server software 56 residing in the web server 48 validates the PIN information added, for example, by way of the PIN pad 32 per step 78. Following this, the package pick-up server 56 runs ActiveX controls on the kiosk 18 to open one or more of the carousel doors 24 (FIG. 3) as shown by step 80. This is followed by step 82 in which the carousel 22 opens the door 24 containing the package including the tracking number. The server software 56 then receives a confirm pick-up command from the kiosk 18 per step 84, which is followed by step 86, whereupon the kiosk 18 returns to the application's main page on the screen 20. This is followed by step 88, whereupon the kiosk 18 ActiveX controls clears memory and returns to the top level screen as shown in FIG. 6.

Figure 8:
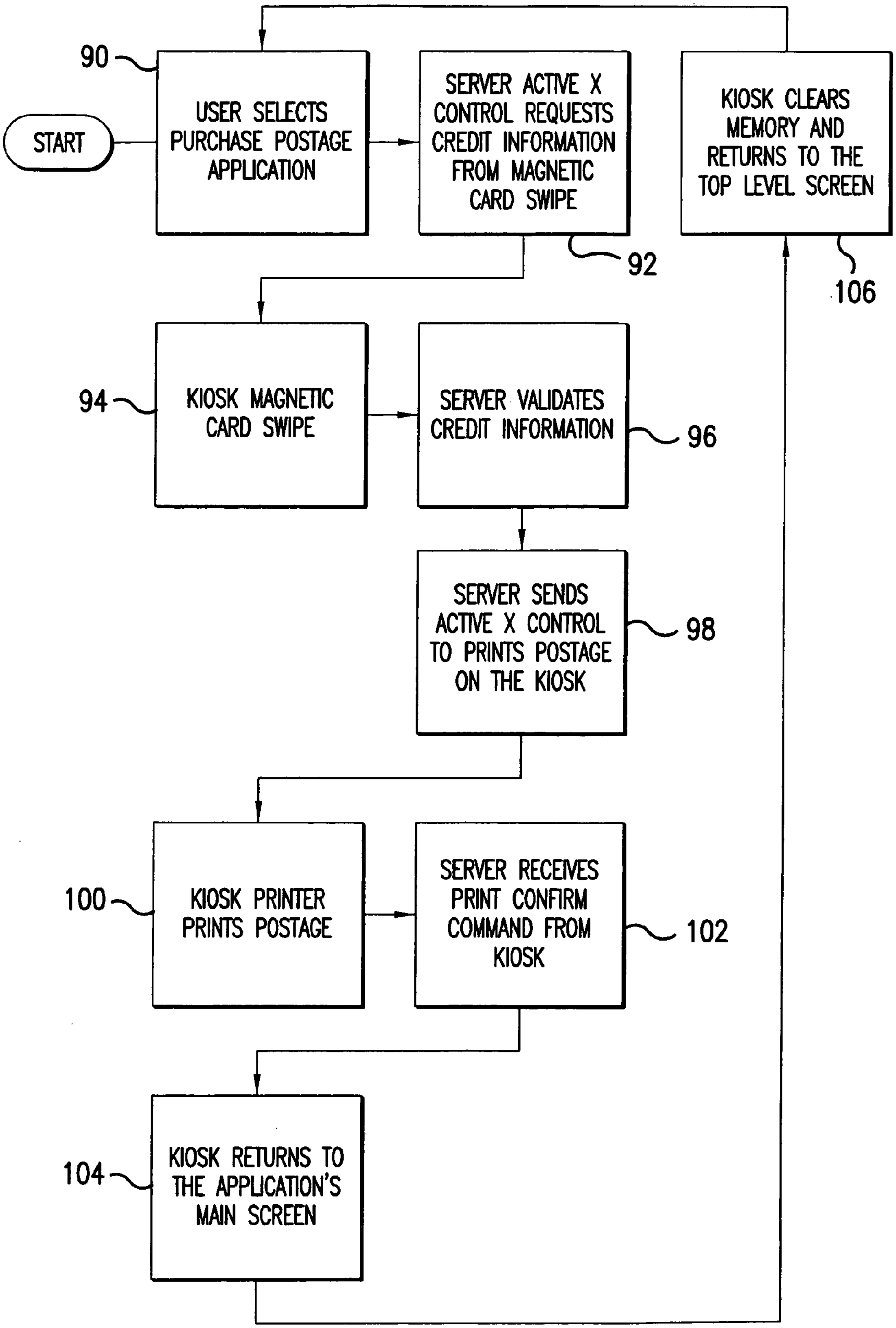
FIG. 8 is a flow chart illustrative of a postage purchase application executed in accordance with the subject invention by another server application shown in FIG. 5.

With reference to the "Purchase Postage" application, the flow chart shown in FIG. 8 begins with the user selecting the purchase postage application by pressing icon 66 (FIG. 6). In step 90, the server software 58 requests "information" from the magnetic card swipe device through ActiveX control at the kiosk 18 per step 92. Next, as shown by step 94, the user performs a magnetic card swipe at the kiosk 18 via the card reader 28. Next, the web server 48 validates credit information as shown by step 58, whereupon the server 48 executes ActiveX control at the kiosk 18 to print postage at the kiosk 18 per step 98. This is followed by the printer 30 at the kiosk printing postage as shown by step 100. The server software 58 next receives a print confirmation from the kiosk browser software 16 at step 102, whereupon the kiosk returns the application's main page per step 104, which is followed by the kiosk 18 again clearing the memory and returning to the top level screen of the touch screen 20, via step 106.

Figure 9:
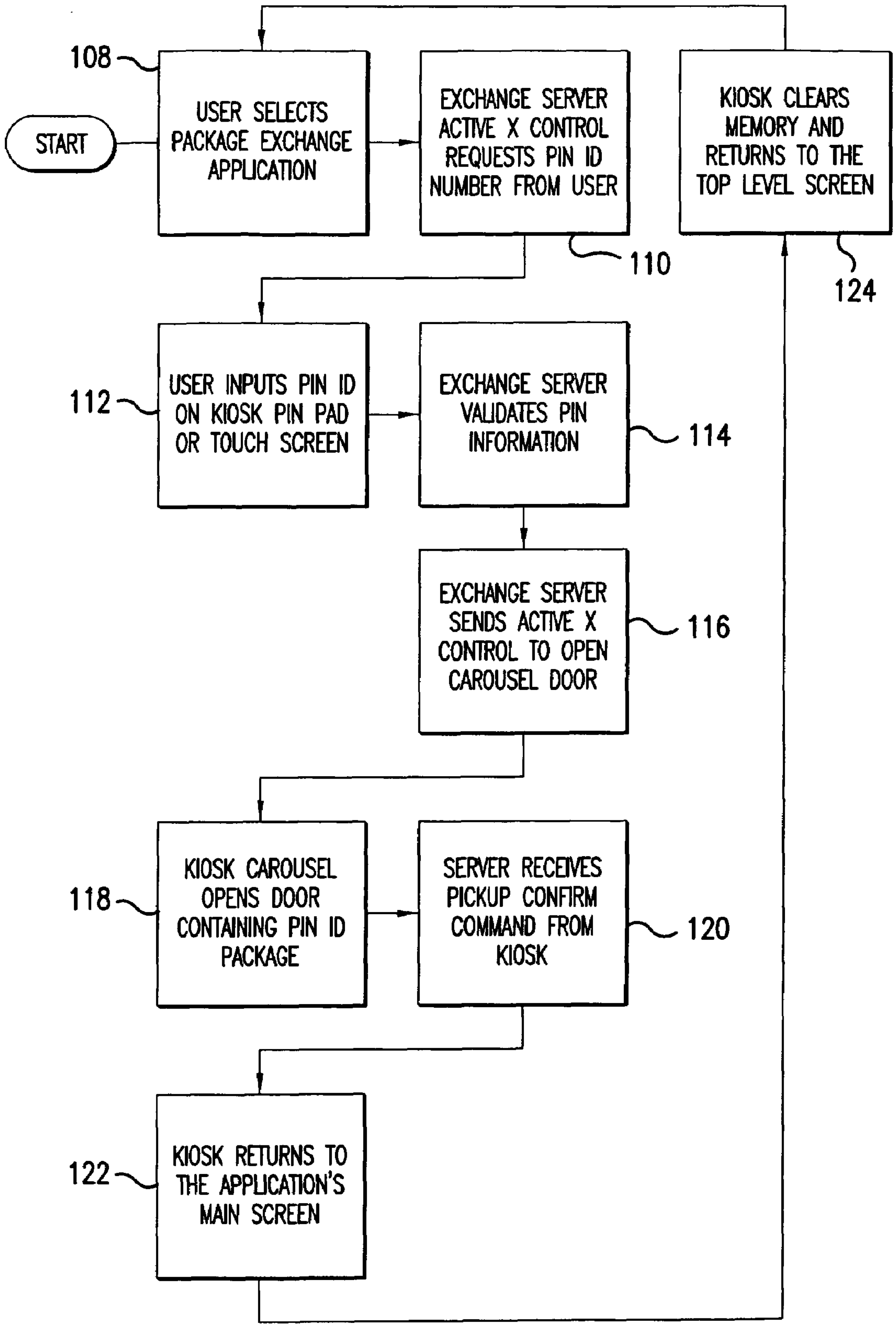
FIG. 9 is illustrative of a flow chart of a package exchange application executed by yet another server application shown in FIG. 5.
Figure 10:
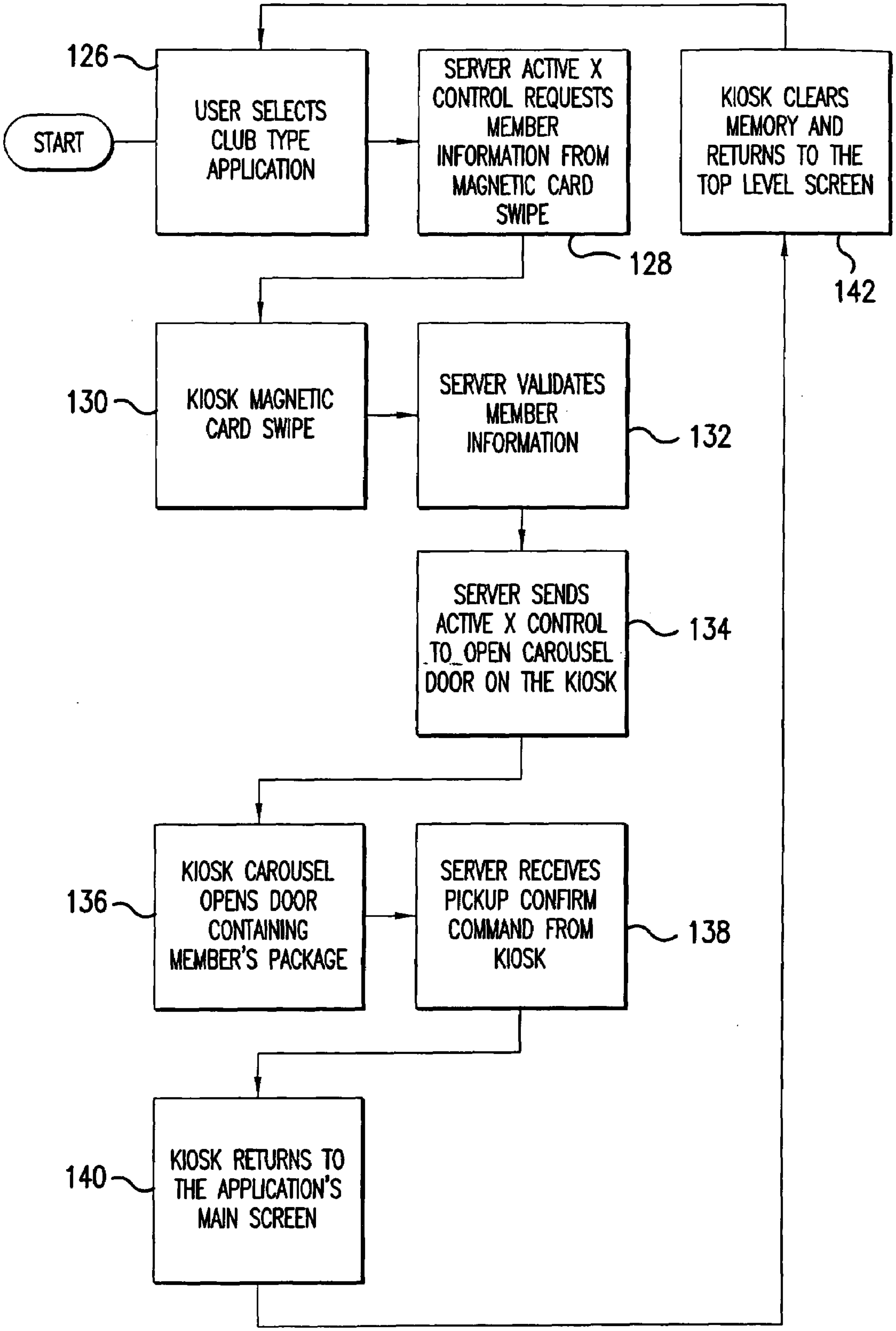
FIG. 10 is a flow chart illustrative of a Club Type application executed by still another server application shown in FIG. 5.

Considering now the "package exchange" application, reference is made to FIG. 9 where the flow chart indicates that the user first selects the package exchange application as shown by step 108 by pressing the icon 68 shown in FIG. 6. This is followed by the exchange server software 60 (FIG. 5) residing in the web server 48, requesting a PIN ID number from the user via ActiveX control at the kiosk 18 per step 110. This is followed by step 112, whereupon the user inputs his/her PIN ID on the kiosk PIN pad 32 or by way of the touch screen 20. The exchange server software 60 then validates the PIN information in step 114, which is followed by the web server 48 using the kiosk 18 ActiveX controls to open the carousel door(s) 24 shown by step 116. One or more of the carousel doors 24 next opens, containing the package with PIN ID per step 118, where the package is retrieved or a return package is inserted in its place or a return package is simply inserted in the door for an exchange. This is followed by step 120, where the server software 60 receives a pick-up confirmation command from kiosk 18 at step 120, which is followed by step 122, where the kiosk 18 returns to the application's main screen and finally the kiosk clears memory and returns to the top level screen per step 124.

With respect to the fourth application termed "Club Type Delivery and Pick-Up", the user at step 126 selects the club type application via icon 70 of FIG. 6. The server software 62 (FIG. 5) residing in the web server 48 uses the ActiveX control at the kiosk 18 to request memory information from the magnetic card swipe device 28. The user then performs a magnetic card swipe operation as shown by step 130 at the card reader 28, whereupon the web server 48 validates memory information in accordance with step 132. Next, the server software 62 uses the kiosk's 18 ActiveX controls to open one or more of the doors 24 of the carousel 22, as shown by step 134. Following this, the carousel 22 opens a door containing the members package shown by step 136 which is followed by the web server 48 receiving a pick-up confirmation command from the kiosk browser 16 software per step 138. Again, this is followed by the kiosk 18 returning to the applicant's main screen per step 140 which is followed by the step of clearing memory and returning to the top level screen 20 as shown by step 142.

Thus what has been shown and described is a self-service kiosk 18 operating in a shared common use environment with an item delivery and retrieval system 10 including a storage carousel 22. Common use shared browser software operates with multiple package service providers as well as a postage provider utilizing shared peripherals of the item delivery and retrieval system.

The foregoing detailed description merely illustrates the principles of the invention. It will thus be appreciated that those skilled in the art will be able to devise various arrangements, which although not explicitly described or shown herein, embody the principles of the invention and are thus within its spirit and scope.

What is claimed:

1. A method of executing one or more independent software application programs from a common use terminal of a hardware platform, comprising the steps of:

launching an application program by browser software located in the common use access terminal;

forming a secure web based connection between the browser software and software of a web server;

providing exclusive control of the hardware platform including one or more peripheral devices associated therewith by said software of the web server for the duration of the application program; and wherein said one or more application programs include a package pick-up application server program, and further comprising the steps of:

selecting said package pick-up application server program at the common use terminal;

requesting tracking information by the package pick-up application server program;

inputting said tracking information at the common use access terminal;

validating the tracking information by the package pick-up application server program;

sending a request to the browser by the package pick-up application server program to open a door of a storage device in the hardware platform for package pick-up;

opening the door in front of a bin containing the package tracking information by the package pick-up server application program;

receiving a pick-up confirmation from the common use access terminal by the package pick-up application server program;

returning a screen at the common use access terminal to a main screen containing a menu of the one or more software application programs; and clearing a memory containing data entered at the beginning of the package pick-up application server program for a subsequent application.

2. The method of claim 1 wherein the common use terminal comprises a kiosk.

3. A method of executing one or more independent software application programs from a common use terminal of a hardware platform, comprising the steps of:

launching an application program by browser software located in a common use access terminal;

forming a secure web based connection between the browser software and software of a web server;

providing exclusive control of the hardware platform including one or more peripheral devices associated therewith by said software of the web server for the duration of the application program; and wherein said one or more application programs include a package exchange application server program, and further comprising the steps of:

selecting said package exchange application server program at the common use terminal;

requesting information by said exchange application server program about a package to be exchanged;

inputting the requested information at the common use access terminal;

validating the requested information by the exchange application server program;

sending a request by the exchange application server program to open a door of a storage device of the hardware platform;

opening the door for insertion of said package to be exchanged;

receiving a package exchange confirmation by the exchange application server program from the user access terminal;

returning a screen located at the common use access terminal to a screen containing a menu of said one or more application programs; and clearing a memory containing data entered at the beginning of the package exchange application program for a subsequent application.

4. The method of claim 3 wherein the common use terminal comprises a kiosk.

5. A method of executing one or more independent software application program from a common use terminal of a hardware platform, comprising the steps of:

launching an application program by browser software located in a common use access terminal;

forming a secure web based connection between the browser software and software of a web server;

providing exclusive control of the hardware platform including one or more peripheral devices associated therewith by said software of the web server for the duration of the application program; and wherein said one or more application programs include an application server program for a club type application and further comprising the steps of:

selecting said club type application server program at the common use terminal;

requesting club member information by the club type application server program;

entering the requested club member information at the common use access terminal;

validating the member information by the club type server application program;

sending a request to the browser to open a door of the hardware platform by the club type server application program;

opening the door of the hardware platform;

receiving a confirmation of the door opening by the club type application server program from the common use access terminal;

returning a screen located at the common use access terminal to a screen display containing a menu of the one or more application programs; and clearing a memory containing data entered at the beginning of the club type application program for a subsequent application.

6. The method of claim 5 wherein the common use terminal comprises a kiosk.

7. A method of executing one or more independent software application programs from a common use terminal of a hardware platform, comprising the steps of:

launching an application program by browser software located in a common use access terminal;

forming a secure web based connection between the browser software and software of a web server;

providing exclusive control of the hardware platform including one or more peripheral devices associated therewith by said software of the web server for the duration of the application program; and wherein said one or more application programs comprises a postage buying application server program, and further comprising the steps of:

selecting said buying postage application server program at the common use terminal;

requesting certain credit information by said buying postage application server program;

entering the requested credit information at the common use access terminal;

validating credit information by said buying postage application server program;

sending a request to the browser by the postage application server program to print postage;

printing postage at the common use access terminal;

receiving a confirmation of printed postage by the postage application server from the common use terminal;

returning a screen located at the common use access terminal to a menu containing said one or more applications; and clearing a memory containing data entered at the beginning of the purchase postage application for a subsequent application.

8. The method of claim 7 wherein the common use terminal comprises a kiosk.

9. A method of executing one or more independent software application programs from a common use terminal of a hardware platform including a computer sub-system, comprising the steps of:

launching an application server program by browser software located in a common use access terminal by a user activating application program selection means located thereat;

forming a secure web based connection between the browser software and software of a web server which thereafter executes said application program;

said web server software assuming exclusive control of the platform including one or more peripheral devices associated therewith for the duration of the application program; and wherein said one or more application programs include a package pick-up application server program and including the steps of:

selecting said package pick-up application program by a user at the common use terminal;

requesting tracking number information from the user by the package pick-up application server program;

inputting a tracking PIN number by the user at the common use access terminal via a bar code reader or a touch screen;

validating the PIN number by the package pick-up web server application program;

sending a request to the browser by the package pick-up server application program to open a door of a storage device in a storage sub-system of the hardware platform;

opening the door in front of a bin containing the package tracking number, receiving a package pick-up confirmation from the common use access terminal by the package pick-up application server program;

returning a screen at the common use access terminal to a main screen containing a menu of the one or more software application programs; and clearing a memory of the data relating to the package pick-up application program inputted by the user for a subsequent application.

10. The method of claim 9 wherein the browser is Active X controlled.

11. The method of claim 9 wherein the common use terminal comprises a kiosk.

12. A method of executing one or more independent software application programs from a common use terminal of a hardware platform including a computer sub-system, comprising the steps of:

launching an application server program by browser software located in a common use access terminal by a user activating application program selection means located thereat;

forming a secure web based connection between the browser software and software of a web server which thereafter executes said application program;

said web server software assuming exclusive control of the platform including one or more peripheral devices associated therewith for the duration of the application program; and wherein said one or more application programs include a package exchange application server program and including the steps of:

selecting said package exchange application server program by a user at the common use terminal;

requesting a PIN ID number from the user by said exchange application server program;

inputting the PIN ID number by the user at the common use access terminal via a PIN pad or touch screen;

validating PIN ID information by the exchange application server program;

the exchange application server program sending a request to the browser to open a door of a storage device of the storage sub-system for a package exchange by the user;

opening the door containing the PIN ID member using controls of the browser;

receiving a package exchange confirmation by the exchange application server program from the user access terminal;

returning a screen located at the common use access terminal to a screen containing a menu of said one or more application programs; and clearing a memory containing data relating to information for the package exchange application program for a subsequent application.

13. The method of claim 12 wherein the browser is Active X controlled.

14. The method of claim 12 wherein the common use terminal comprises a kiosk.

15. A method of executing one or more independent software application programs from a common use terminal of a hardware platform, comprising the steps of:

launching an application server program by browser software located in a common use access terminal by a user activating application program selection means located thereat;

forming a secure web based connection between the browser software and software of a web server which thereafter executes said application program;

said web server software assuming exclusive control of the platform including one or more peripheral devices associated therewith for the duration of the application program; and wherein said one or more application programs include an application server program for a club type application and including the steps of:

selecting the club type application server program by the user at the common use terminal;

requesting club member information from a magnetic card of a user by the club type application at the common use access terminal;

swiping the card in a card reader by the user at the common use access terminal;

validating the member information by the club type server application program;

sending a request to the browser by the club type server application program to open a door of a storage device of the storage sub-system;

opening the door containing a package requested by the member;

receiving a package retrieval confirmation by the club type application server program from the common use access terminal;

returning a screen located at the common use access terminal to a screen display containing a menu of the one or more application programs; and clearing a memory containing data related to the information inputted by the user at the beginning of the club type application program for a subsequent application.

16. The method of claim 15 wherein the browser is Active X controlled.

17. The method of claim 15 wherein the common use terminal comprises a kiosk.

18. A method of executing one or more independent software application programs from a common use terminal of a hardware platform, comprising the steps of:

launching an application server program by browser software located in a common use access terminal by a user activating application program selection means located thereat;

forming a secure web based connection between the browser software and software of a web server which thereafter executes said application program;

said web server software assuming exclusive control of the platform including one or more peripheral devices associated therewith for the duration of the application program; and wherein said one or more application programs comprises a postage buying application server program and including the steps of:

selecting the buying postage application server program by the user at the common use terminal;

requesting credit information from the user by said buying postage application server program using the browser in the common use access terminal;

swiping a magnetic card including credit information by the user at a card reader located at the common use access terminal;

validating credit information by said buying postage application server program;

sending a request to the browser by the postage application server program to print postage;

printing postage at the common use access terminal;

receiving a confirmation of printed postage by the postage application server from the common use terminal;

returning a screen located at the common use access terminal to a menu containing said one or more applications; and clearing a memory of the data entered by the user at the beginning of the purchase postage application for a subsequent application.

19. The method of claim 18 wherein the browser is Active X controlled.

20. The method of claim 18 wherein the common use terminal comprises a kiosk.

* * * * *